(12) United States Patent
Narasimhan et al.

(10) Patent No.: US 11,968,119 B1
(45) Date of Patent: Apr. 23, 2024

(54) SERVICE FUNCTION CHAINING USING USID IN SRV6

(71) Applicant: Ciena Corporation, Hanover, MD (US)

(72) Inventors: Ashwath Narasimhan, Milpitas, CA (US); Muthurajah Sivabalan, Kanata (CA); Tao Wang, Ottawa (CA); Jahanzeb Baqai, Livermore, CA (US)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 18/108,288

(22) Filed: Feb. 10, 2023

Related U.S. Application Data (60) Provisional application No. 63/416,224, filed on Oct. 14, 2022.

(51) Int. Cl.
*H04L 45/00* (2022.01)
*H04L 69/22* (2022.01)

(52) U.S. Cl.
CPC .............. *H04L 45/34* (2013.01); *H04L 69/22* (2013.01)

(58) Field of Classification Search
CPC ......... H04L 45/28; H04L 45/34; H04L 45/74; H04L 45/745; H04L 45/20; H04L 45/741; H04L 43/0852; H04L 43/22
USPC ........................................................ 709/238
See application file for complete search history.

(56) References Cited

U.S. PATENT DOCUMENTS

| | | | |
|---|---|---|---|
| 7,031,262 B2 | 4/2006 | Vasseur et al. | |
| 7,599,349 B2 | 10/2009 | Vasseur et al. | |
| 7,626,925 B1 | 12/2009 | Sivabalan et al. | |
| 7,684,351 B2 | 3/2010 | Vasseur et al. | |
| 7,801,048 B1 | 9/2010 | Sivabalan et al. | |
| 8,004,964 B2 | 8/2011 | Boutros et al. | |
| 8,131,873 B2 | 3/2012 | Vasseur et al. | |
| 8,320,255 B2 | 11/2012 | Vasseur et al. | |
| 8,391,163 B2 | 3/2013 | Boutros et al. | |
| 8,572,225 B2 | 10/2013 | Scudder et al. | |
| 8,908,527 B2 | 12/2014 | Boutros et al. | |
| 8,976,682 B2 | 3/2015 | Boutros et al. | |
| 9,313,145 B2 | 4/2016 | Gandhi et al. | |
| 9,450,858 B2 | 9/2016 | Saad et al. | |
| 9,497,107 B1 | 11/2016 | Akiya et al. | |

(Continued)

FOREIGN PATENT DOCUMENTS

WO 2022055861 A1 3/2022

OTHER PUBLICATIONS

ETSI, "IPv6 Enhanced Innovation (IPE); IPv6 based enterprise networking and Industrial Internet," ETSI ISG IPE 004 V0.0.9, Dec. 6, 2021, pp. 1-60.

(Continued)

*Primary Examiner* — Sargon N Nano
(74) *Attorney, Agent, or Firm* — Baratta Law PLLC; Lawrence A. Baratta, Jr.

(57) ABSTRACT

A node in a Segment Routing Internet Protocol version 6 (SRv6) network includes circuitry configured to, for a packet destined to a Service Function Chain (SFC), encode one or more micro-Segment Identifiers (uSIDs) for the SFC, wherein at least one uSID of the one or more uSIDs includes an Endpoint Behavior field, responsive to the at least one uSID needing one or more Arguments, include the one or more Arguments after the Endpoint Behavior field, and transmit the packet towards the SFC. The present disclosure presents various techniques to utilize uSIDs for SFC.

17 Claims, 7 Drawing Sheets

(56) References Cited

U.S. PATENT DOCUMENTS

| | | | |
|---|---|---|---|
| 9,647,929 | B2 | 5/2017 | Alvarez et al. |
| 9,699,087 | B2 | 7/2017 | Boutros et al. |
| 9,722,916 | B2 | 8/2017 | Sivabalan et al. |
| 9,979,629 | B2 | 5/2018 | Sivabalan et al. |
| 10,063,463 | B2 | 8/2018 | Saad et al. |
| 10,158,558 | B1 | 12/2018 | Ward et al. |
| 10,164,875 | B2 * | 12/2018 | Guichard ............... H04L 45/50 |
| 10,182,000 | B2 | 1/2019 | Saad et al. |
| 10,250,459 | B2 | 4/2019 | Ali et al. |
| 10,567,295 | B2 | 2/2020 | Barton et al. |
| 11,102,109 | B1 | 8/2021 | Narasimhan et al. |
| 11,496,354 | B2 | 11/2022 | Boutros et al. |
| 11,516,112 | B2 | 11/2022 | Boutros et al. |
| 11,552,879 | B1 | 1/2023 | Sivabalan et al. |
| 2011/0280121 | A1 | 11/2011 | Boutros et al. |
| 2013/0272305 | A1 * | 10/2013 | Lefebvre ............... H04L 45/306 |
| | | | 370/392 |
| 2014/0112124 | A1 | 4/2014 | Sivabalan et al. |
| 2015/0030020 | A1 * | 1/2015 | Kini ...................... H04L 45/28 |
| | | | 370/389 |
| 2015/0124815 | A1 * | 5/2015 | Beliveau ............... H04L 45/38 |
| | | | 370/392 |
| 2015/0195197 | A1 * | 7/2015 | Yong .................... H04L 45/306 |
| | | | 370/392 |
| 2015/0304185 | A1 | 10/2015 | Frost et al. |
| 2016/0028640 | A1 * | 1/2016 | Zhang .................. H04L 67/561 |
| | | | 370/389 |
| 2017/0026461 | A1 | 1/2017 | Boutros et al. |
| 2017/0048138 | A1 | 2/2017 | Sivabalan et al. |
| 2017/0064717 | A1 | 3/2017 | Filsfils et al. |
| 2017/0230274 | A1 | 8/2017 | Filsfils et al. |
| 2018/0054389 | A1 * | 2/2018 | Ao ....................... H04L 47/125 |
| 2018/0109450 | A1 | 4/2018 | Filsfils et al. |
| 2019/0297017 | A1 | 9/2019 | Pignataro et al. |
| 2020/0153856 | A1 | 5/2020 | Nainar et al. |
| 2020/0204479 | A1 | 6/2020 | Filsfils et al. |
| 2020/0389401 | A1 * | 12/2020 | Enguehard ............ H04L 45/745 |
| 2021/0092043 | A1 | 3/2021 | Filsfils et al. |
| 2022/0131721 | A1 | 4/2022 | Boutros et al. |
| 2022/0174011 | A1 * | 6/2022 | Filsfils ................. H04L 45/123 |
| 2022/0200903 | A1 | 6/2022 | Boutros et al. |
| 2022/0286395 | A1 * | 9/2022 | Gandhi ................. H04L 45/20 |
| 2022/0337514 | A1 * | 10/2022 | Lu ........................ H04L 45/34 |
| 2022/0407801 | A1 * | 12/2022 | Qiu ....................... H04L 45/28 |
| 2023/0078123 | A1 * | 3/2023 | Zhang ................. H04L 12/4641 |
| | | | 709/238 |

OTHER PUBLICATIONS

Dec. 21, 2023, International Search Report and Written Opinion for International Patent Application No. PCT/US2023/035115.

* cited by examiner

SERVICE FUNCTION CHAINING USING USID IN SRV6

CROSS-REFERENCE TO RELATED APPLICATION(S)

The present disclosure claims priority to U.S. Provisional Patent Application No. 63/416,224, filed Oct. 14, 2022, the contents of which are incorporated by reference in their entirety.

FIELD OF THE DISCLOSURE

The present disclosure relates generally to networking and computing. More particularly, the present disclosure relates to systems and methods for service function chaining using micro-Segment Identifier (SID) (uSID) in Segment Routing Internet Protocol version 6 (SRv6).

BACKGROUND OF THE DISCLOSURE

Service function chaining (SFC) is a mechanism that allows various service functions to be connected to each to form a service enabling carriers to benefit from virtualized software defined infrastructure. SFC can use SRv6 to connect the various network services, network functions, etc. The conventional approach with SRv6 uses a classical SID (Uncompressed SID) to perform SFC. The uncompressed SID as the name suggests does not provide a high rate of SID compression. Therefore, this increases the required path maximum transmission unit (MTU). There is a micro-SID (uSID) implementation that enables compression of the SRv6 header (SRH). A description of the uSID is provided in Filsfils et al., draft-filsfils-spring-net-pgm-extension-srv6-usid-13, "Network Programming extension: SRv6 uSID instruction," 13 Jun. 2022, and A. Tulumello et al., "Micro SIDs: a solution for Efficient Representation of Segment IDs in SRv6 Networks," 2020 16th International Conference on Network and Service Management (CNSM), 2020, pp. 1-10, doi: 10.23919/CNSM50824.2020.9269075, the contents of each are incorporated by reference in their entirety.

There are no known solutions for systems that use the uSID mechanism to perform SFC. There is no known way to encode Function and Arguments fields when using the uSID mechanism.

BRIEF SUMMARY OF THE DISCLOSURE

The present disclosure relates to systems and methods for service function chaining using micro-Segment Identifier (SID) (uSID) in Segment Routing Internet Protocol version 6 (SRv6). In an embodiment, the present disclosure includes a larger 32-bit uSID, namely aggregating two uSIDs to support a Node ID and Service Identifier field along with specialized endpoint behavior. In another embodiment, the present disclosure includes dividing the range represented by an existing 16-bit uSID into sub-ranges. The values within the sub-ranges can be assigned to specialized node SIDs for Service Functions, so this embodiment can avoid the Service Identifier due to its presence in the sub-range, allowing use of the standard sized uSID. For SFC, the uSIDs can denote or convey specialized 'End-point behavior' and a 'Number of Arguments' that will have a value to identify both the endpoint behavior value and the number of arguments encoded following it. The present disclosure keeps the advantage of high compression rate offered by uSID, as well as allowing for extra functionality to support SFC. With the standard sized uSID, the new Endpoint behavior can identify the SFC based end point behavior and number of arguments following the end point behavior value.

In an embodiment, a node in a Segment Routing Internet Protocol version 6 (SRv6) network includes circuitry configured to, for a packet destined to a Service Function Chain (SFC), encode one or more micro-Segment Identifiers (uSIDs) for the SFC, wherein at least one uSID of the one or more uSIDs includes an Endpoint Behavior field, responsive to the at least one uSID needing one or more Arguments, include the one or more Arguments after the Endpoint Behavior field, and transmit the packet towards the SFC. The circuitry can be further configured to advertise a structure of the uSID via a Type-Length-Value (TLV) utilizing Interior Gateway Protocol (IGP). The at least one uSID can include one or more of a node identifier field and a service identifier field. The at least one uSID can include one of (1) a Number of Arguments field that specifies a number of the one or more Arguments and (2) the number of the one or more Arguments being embedded in the Endpoint Behavior field. The at least one uSID can include a size greater than 16-bits. The at least one uSID can be in a sub-group having a pre-defined range to denote the at least one uSID is for Service Functions (SFs). In addition to the sub-group to denote SFs, there can be at least one additional sub-group range for identifying any of locally assigned uSID ranges and globally assigned uSID ranges. The Endpoint Behavior field can encode both behavior and a Number of Arguments field that specifies a number of the one or more Arguments.

In another embodiment, a method implemented by a node in a Segment Routing Internet Protocol version 6 (SRv6) network includes the steps of, for a packet destined to a Service Function Chain (SFC), encoding one or more micro-Segment Identifiers (uSIDs) for the SFC, wherein at least one uSID of the one or more uSIDs includes an Endpoint Behavior field; responsive to the at least one uSID needing one or more Arguments, including the one or more Arguments after the Endpoint Behavior field; and transmitting the packet towards the SFC. The steps can further include advertising a structure of the uSID via a Type-Length-Value (TLV) utilizing Interior Gateway Protocol (IGP). The at least one uSID can include one or more of a node identifier field and a service identifier field. The at least one uSID can include one of (1) a Number of Arguments field that specifies a number of the one or more Arguments and (2) the number of the one or more Arguments being embedded in the Endpoint Behavior field. The at least one uSID can include a size greater than 16-bits. The at least one uSID can be in a sub-group having a pre-defined range to denote the at least one uSID is for Service Functions (SFs). In addition to the sub-group to denote SFs, there can be at least one additional sub-group range for identifying any of locally assigned uSID ranges and globally assigned uSID ranges. The Endpoint Behavior field can encode both behavior and a Number of Arguments field that specifies a number of the one or more Arguments.

In a further embodiment, a non-transitory computer-readable medium includes instructions that, when executed, cause a node, in a Segment Routing Internet Protocol version 6 (SRv6) network, to perform steps of, for a packet destined to a Service Function Chain (SFC), encoding one or more micro-Segment Identifiers (uSIDs) for the SFC, wherein at least one uSID of the one or more uSIDs includes an Endpoint Behavior field; responsive to the at least one uSID needing one or more Arguments, including the one or more Arguments after the Endpoint Behavior field; and transmitting the packet towards the SFC. The steps can further include advertising a structure of the uSID via a Type-Length-Value (TLV) utilizing Interior Gateway Protocol (IGP). The at least one uSID can specify a Number of Arguments based on either a field that specifies a number of the one or more Arguments or based on encoding in the Endpoint Behavior field. The at least one uSID can include a size greater than 16-bits.

BRIEF DESCRIPTION OF THE DRAWINGS

The present disclosure is illustrated and described herein with reference to the various drawings, in which like reference numbers are used to denote like system components/ method steps, as appropriate, and in which.

DETAILED DESCRIPTION OF THE DISCLOSURE

Again, the present disclosure relates to systems and methods for service function chaining using micro-Segment Identifier (SID) (uSID) in Segment Routing Internet Protocol version 6 (SRv6). In an embodiment, the present disclosure includes a larger 32-bit uSID, namely aggregating two uSIDs to support a Node ID and Service Identifier field along with specialized endpoint behavior. In another embodiment, the present disclosure includes dividing the range represented by an existing 16-bit uSID into subranges. The values within the sub-ranges can be assigned to specialized node SIDs for Service Functions, so this embodiment can avoid the Service Identifier due to its presence in the sub-range, allowing use of the standard sized uSID. For SFC, the uSIDs can denote or convey specialized 'End-point behavior' and a 'Number of Arguments' that will have a value to identify both the endpoint behavior value and the number of arguments encoded following it. The present disclosure keeps the advantage of high compression rate offered by uSID, as well as allowing for extra functionality to support SFC. With the standard sized uSID, the new Endpoint behavior can identify the SFC based end point behavior and number of arguments following the end point behavior value.

As described herein, the present disclosure provides various techniques to support locators, functions, and arguments with uSIDs. In one embodiment, the uSID has a larger size than standard, e.g., 32-bits, and this embodiment utilizes the larger size to include the locators, functions, and arguments. In another embodiment, the uSID has the standard size, i.e., 16-bits, and this embodiment utilizes a pre-defined subrange to avoid the need to specify a Service identifier as well as encoding the number of arguments in the endpoint behavior—these approaches conserve valuable space in the compressed uSID.

INTRODUCTION

Figure 1:
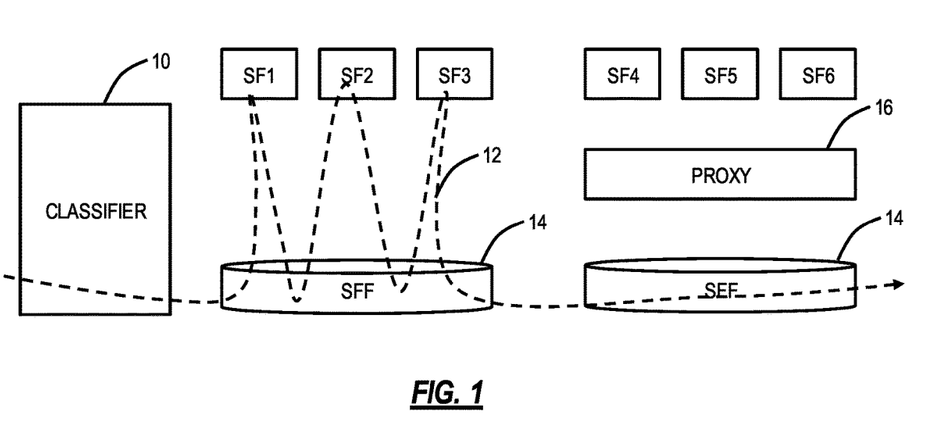
FIG. 1 is a diagram of an example of the basic architecture of Service Function Chaining (SFC).

Service Function Chaining (SFC) using SRv6 helps create a service chain of connected network services. One advantage of using SFC is to automate the way the network can be set up to handle different traffic flows. FIG. 1 is a diagram of an example of the basic architecture of Service Function Chaining (SFC). A Classifier 10 forwards the traffic to a specific Service Function Path (SFP) 12 based on certain set of configured rules. A Service Function Forwarder (SFF) 14 forwards the traffic received to one or more Service Functions (SF) (labeled as SF1-SF6) using the information in the SFC encapsulation. The Service Functions (SF) are responsible for specific treatment of the received traffic. SF can be either SFC-aware or SFC-unaware. An SFC proxy 16 is required for adding and removing SFC encapsulation when delivering packets to SFC-unaware Service Functions. For example, the SFF 14 can be a router or virtual router. The various SFs can be virtual network functions (VNFs), physical network elements, etc. As described herein, the term node can denote a router, a VNF, a physical network element, or any network element in an SRv6 network capable of transmitting and receiving packets with uSIDs for purposes of SFC over SRv6.

Figure 2:
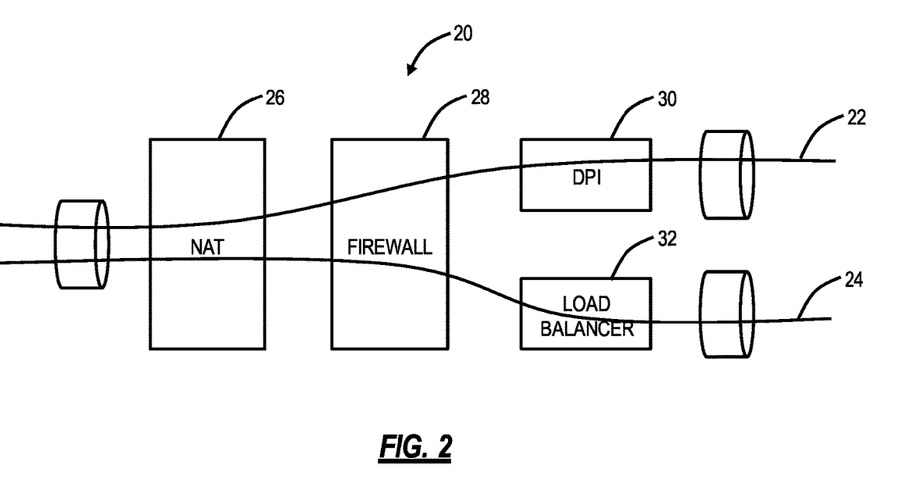
FIG. 2 is a diagram of a Service Function Chaining example.

FIG. 2 is a diagram of a Service Function Chaining example 20. FIG. 2 shows two flows 22, 24. One flow 22 passes through Network Address Translation (NAT) 26, Firewall 28, and Deep Packet Inspection (DPI) 30 while the other flow 24 passes through NAT 26, Firewall 28, and Load balancer 32. With the advent of Network Function Virtualization (NFV), traditional appliances can be replaced with software modules. These are called Service Functions (SFs). The SRv6 technology helps in steering the traffic through a pre-determined list of SFs. This is achieved by assigning a SRv6 segment identifier (SID) to each of the modules and sequencing them in a SID list.

Figure 3:
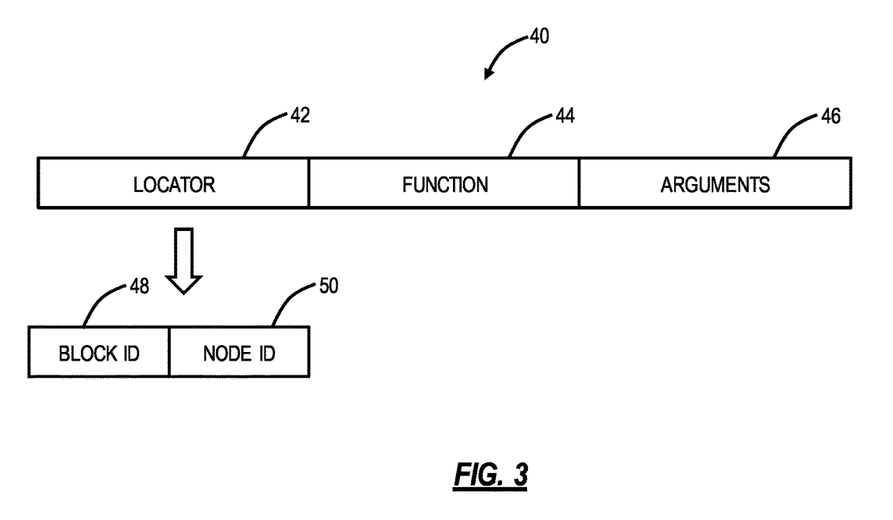
FIG. 3 is a diagram of a SRv6 SID Format.

A SRv6 SID 40 is represented by 128 bits address and it is split in three fields Locator 42, Function 44, Arguments 46, respectively, as illustrated in FIG. 3. The Locator 42 is represented by the most significant bits and is the routable portion of the SID 40. The Locator 42 is further split into locator block ID 48 and node ID 50. The function identifies the behaviour bound to that SID 40. Any additional information required by an SRv6 end point can be encoded in the Argument field. The functionality of the Locator 42, the Function 44, and the Arguments 46 is described, e.g., in C. Filsfils et al., "SRv6 Network Programming," draft-ietf-spring-srv6-network-programming-07, Dec. 19, 2019, the contents of which are incorporated by reference. This document describes the use of a standard size SID for SFC, not uSID. Locator 42

The Locator 42 can have a flexible length and an operator is free to use the locator length of their choice. The Locator 42 identifies the node which instantiates the SID. The Function 44 is an opaque identification of a local behavior bound to the SID. The term "function" refers to the bit-string in the SRv6 SID. The term "behavior" identifies the behavior bound to the SID. An SRv6 endpoint behavior may require additional information for its processing (e.g., related to the flow or service). This information may be encoded in the Arguments 46.

Figure 4:
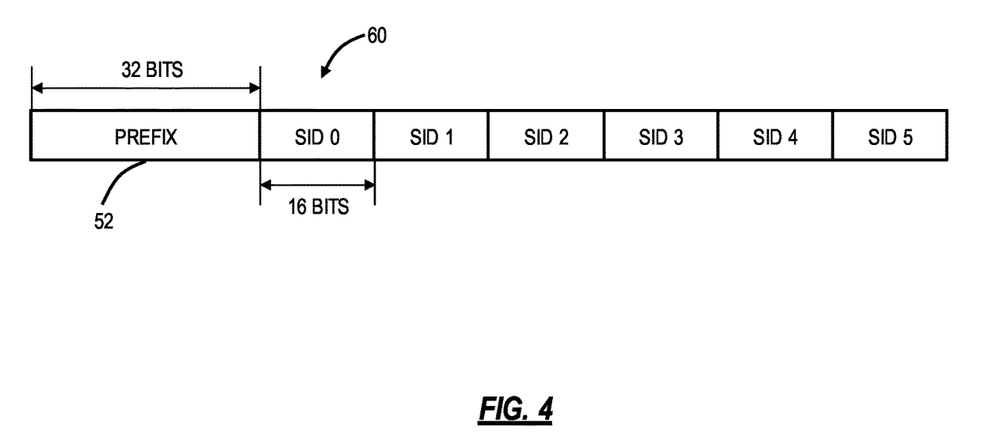
FIG. 4 is a diagram of a Micro-Segment (uSID) Frame Format using 128-bit IPv6 Address.

An uncompressed SRv6 SID is 128-bit long. The SRv6 architecture supports the ability to carry multiple smaller SIDs called micro SIDs (uSIDs) in a 128 uncompressed SID. Such ability leads to reduced MTU overhead associated with uncompressed SIDs. A uSID is 16-bit long. The 128-bit IPv6 address shares a common prefix 52 and several uSIDs 60 as shown in FIG. 4. In FIG. 4, the common prefix is 32 bits long.

Problem

While the uSID instruction does a remarkable job in compressing the SIDs and reducing the MTU, the ability to associate an endpoint behavior (Function) and Arguments to the SID is lost. Unlike the classical SID, passing the packet to an endpoint associated with a particular function and providing arguments to the end point is not possible using uSID instructions.

Solution—Larger uSID

Variously, the present disclosure includes techniques to embed the Function and Argument for service chaining using a uSID. In an embodiment, the present disclosure can include use of a larger uSID (e.g., 32-bit uSID) instead of a 16-bit uSID. The larger uSID can include two fields functionally for a 'Node Id' and 'Service Identifier'. The 'Service Identifier' field can include functionality for 'Endpoint Behavior' and the 'Num of Arguments' fields. The 'Num of Arguments' shall track the Arguments following the uSID. Note that the uSID is processed from left to right, so the arguments will follow the uSID on the right.

The following section discusses an example implementation. Those skilled in the art will recognize the specific sizes (i.e., of the fields, bits, etc.) are for illustration purposes, and other sizes are contemplated.

Figure 5:
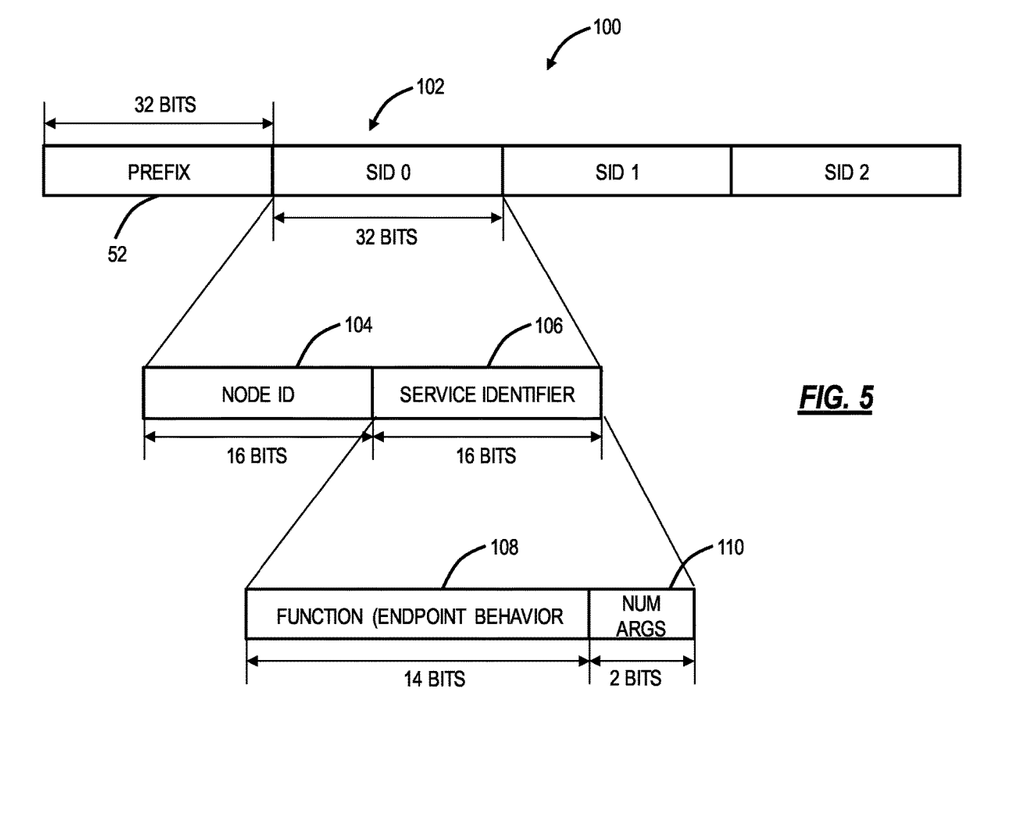
FIG. 5 is a diagram of an example uSID format for SFC where the uSID has a larger size.

FIG. 5 is a diagram of an example uSID format 100 for SFC where the uSID has a larger size. In this example embodiment, the present disclosure, for example, proposes to use a 32-bit SFC uSID 102 instead of a 16-bit uSID 60. The first 16-bits can identify the Node, i.e., a node ID 104, the next 16 bits called "Service Identifier" bits can encode information specific to the Node, i.e., Service Identifier 106. Out of the 16-bit "Service Identifier" 106, the first 14 most significant bit (MSB) bits can identify the Endpoint behavior (Function 108) and the last 2 bits can identify a number 110 of 16-bit Arguments following the "Service Identifier" bits. Note, FIG. 5 illustrates the uSID format 100 in a hierarchical manner breaking down the uSID 102 into the node ID 104 and the service identifier 106, and further breaking down the service identifier 106 into the function 108 and the number 110 of Arguments.

Figure 6:
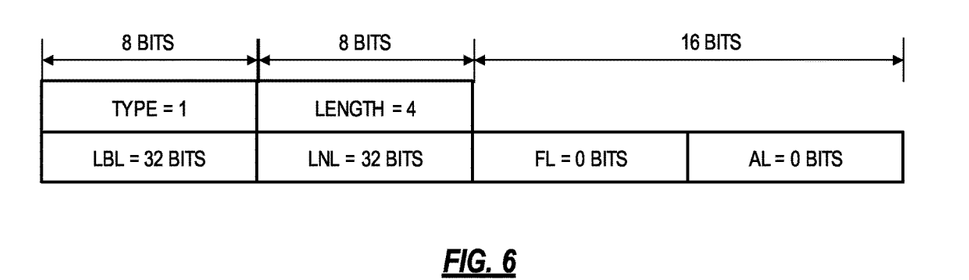
FIG. 6 is a diagram of a SID structure sub-sub-TLV for SFC uSID where the uSID has a larger size.

In an embodiment, the present disclosures proposes that a SID structure sub-sub-type-length-value (TLV) that is advertised via Interior Gateway Protocol (IGP) protocols (Intermediate System-Intermediate System (ISIS), Open Shortest Path First (OSPF), Border Gateway Protocol-Link State (BGP-LS), BGP) shall be modified to reflect the new uSID as shown in FIG. 6 to indicate the presence of a 32-bit SID. The Locator Block Length (LBL) would be 32 bits. The Locator Node Length (LNL) would be 16 bits. The Function Length (FL) will be 14 bits in length and the Argument Length (AL) will be 2 bits. The entire SID includes 32-bits.

This SID structure sub-sub-TLV would advertise the format of the SID to remote node nodes.

In addition to this, in an embodiment, the present disclosure further proposes to define new end-point behavior functions that helps remote nodes decode the frame. For example, an Endpoint behavior value of 100 could indicate SRv6 END behavior supporting 32-bit uSID for SFC. This indicates to the remote nodes that they need to process the subsequent 32-bit arguments following the 32-bit modified SFC uSID based on the number of arguments indicated in the 'Service Identifier' field.

Use Case Example—Larger uSID

Figure 7:
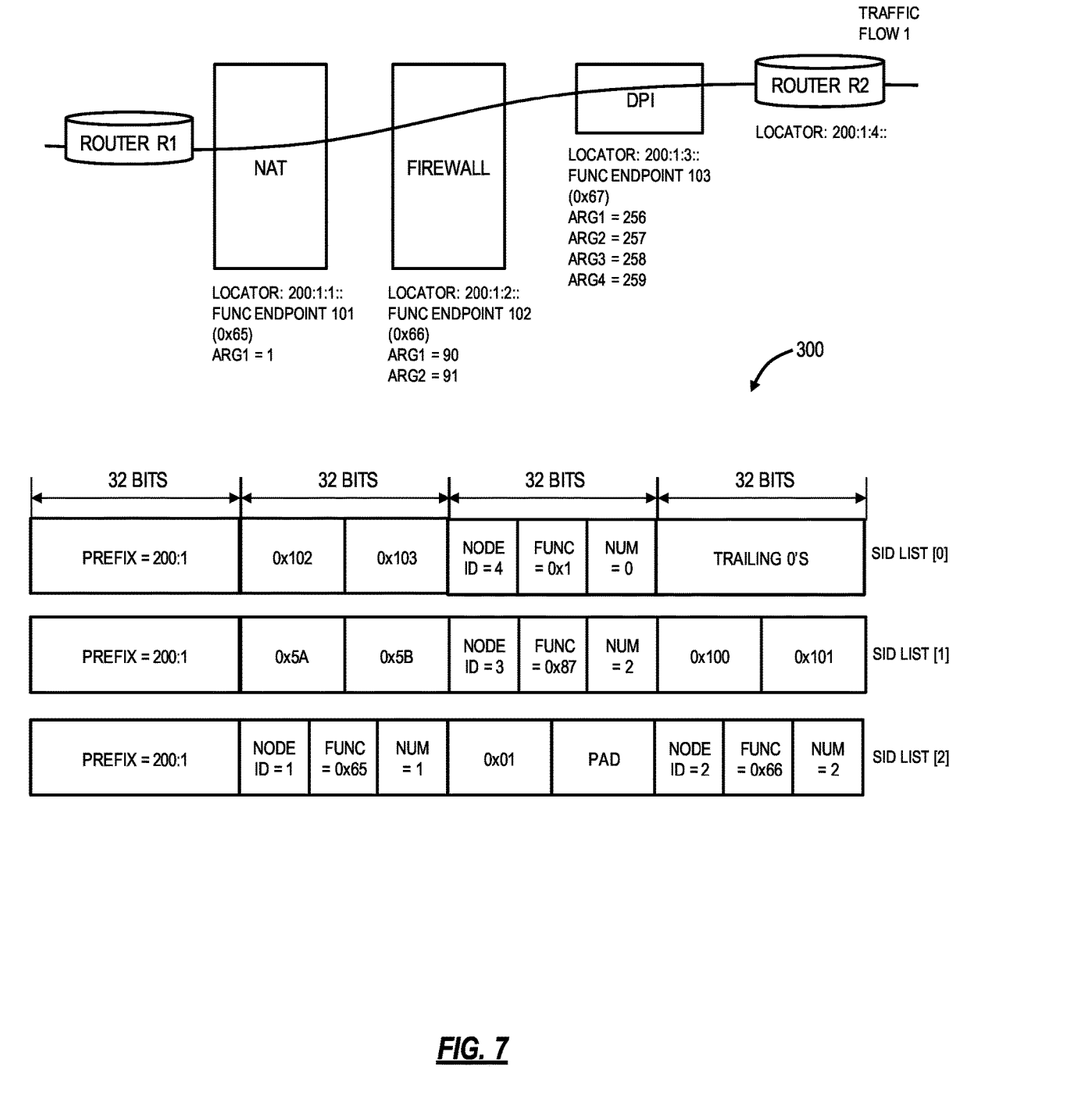
FIG. 7 is a diagram of an example use case showing a modified uSID Frame Format where the uSID has a larger size.

Assume NAT, Firewall and DPI are the three SF's and two routers R1 and R2 as shown in the figure below and the traffic flows through this path sequentially. The source of Service Function Path (SFP) is Router R1 and the SFP includes NAT, Firewall, DPI and Router R2. Each of the SF's and the routers have a common 32-bit prefix block, e.g., 200:1::/32. Each of the three SF's are represented by node SIDs 1, 2, & 3 and have endpoint behavior 101, 102 & 103 respectively. The router R2 has a node SID of 4. Assume the Firewall has two 16-bit Arguments, NAT has one 16-bit Argument and DPI has four 16-bit Arguments. Then the SID is encoded as shown in FIG. 7.

Realizing the above using Classical SID would require one more 128-bit segment.

Notes

'Padding' bits can be added to the last argument since operation is at the 32-bit boundary.

The present disclosure is applicable to all protocols that use the uSID mechanism (BGP, BGP-LS, IS-IS, OSPF).

The present disclosure can interoperate with Service Function-unaware nodes with the help of a Proxy.

The present disclosure is applicable to Virtual Routers and Network management systems such as Software Defined Networking (SDN) controllers as well.

The present disclosure allows the advantage of the high compression offered by the uSID mechanism and at the same time it also provides a way to support additional functionality for the SFC use case.

Solution—Standard Size uSID

In another embodiment, the present disclosure proposes a unique way to embed Function and Argument for service chaining using standard size uSID. For example, the present disclosure proposes using specialized 16-bit uSIDs from a particular range to represent nodes identifying as Service Functions (SF). The present disclosure proposes that the presence of the specialized uSID would further indicate the presence of a specialized Endpoint behavior. The specialized Endpoint Behavior shall also describe the 'Num of Arguments' and it will have the 'Num of Arguments' fields encoded as part of its distinct Endpoint behavior value. This value shall indicate the number of Arguments following the uSID. Note that the uSID is processed from left to right, so the arguments will follow the USID on the right.

In an embodiment, the present disclosure allocates a range for the 16-bit SID exclusively to represent node SID assignment to SFs. The 16-bits represent 64K SIDs. The invention proposes to divide this range into sub-groups where one of the sub-groups represents SF based node SID while other ranges can represent a normal uSID based device. By setting ranges in advance, we can save space in the uSID, i.e., allow use of a standard sized uSID of 16-bits versus the other embodiment utilizing a larger size (32-bit uSID).

Those skilled in the art will appreciate the ranges of the sub-groups can be flexible, and any such choice is contemplated under the present disclosure. For an example, the 64K SIDs can be divided into three sub-groups:

(1) 0x1FFF—shall represent locally assigned uSIDs,
(2) 0x2000-0x6000—shall represent uSIDs assigned to SFs, and
(3) 0x6001-0xFFFF—shall represent globally assigned USIDs.

Again, these ranges are flexible. The sub-groups will at least include a sub-group of uSIDs assigned to SFs and another sub-group of local/global uSID.

From the example above, if a node SID with value between 0x2000-0x6000 is encountered, then the subsequent 16-bits are automatically assumed to have specialized endpoint behavior (Function) encoded in them and are also parsed.

In addition to this, the present disclosure further proposes to overload the endpoint behavior to encode both the behavior and the number of arguments following the behavior. For example, a user defined endpoint behavior value of 1000 could represent END with no arguments and a user defined endpoint behavior value of 1001 could represent END with single argument, and the like.

The present disclosure proposes that if an Endpoint behavior encoded with argument is encountered, then the subsequent 16-bit uSIDs equivalent to the number of Arguments shall be processed.

Figure 8:
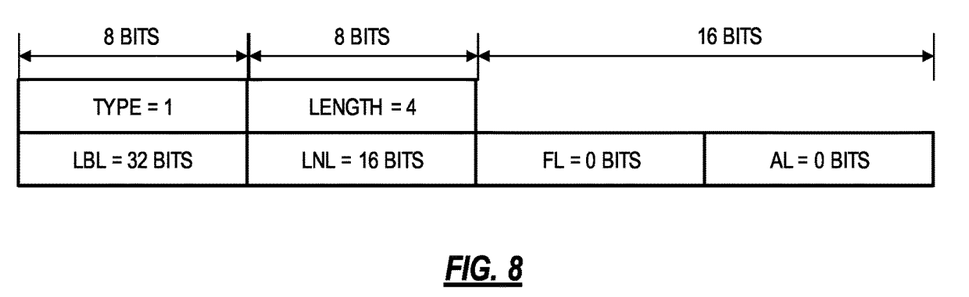
FIG. 8 is a diagram of a SID structure sub-sub-TLV for SFC uSID where the uSID has a standard size.

The invention proposes that SID structure sub-sub-TLV that is advertised via IGP protocols (ISIS, OSPF, BGP-LS, BGP) shall be modified as shown in FIG. 8 to indicate the presence of a 16-bit SID. The Locator Block Length (LBL) would be 32 bits. The Locator Node Length (LNL) would be 16 bits. The Function Length (FL) will be 0 bits in length and the Argument Length (AL) will be 0 bits. The entire SID structure includes 32-bits.

This SID structure sub-sub-TLV would advertise the format of the SID to remote node nodes.

Figure 9:
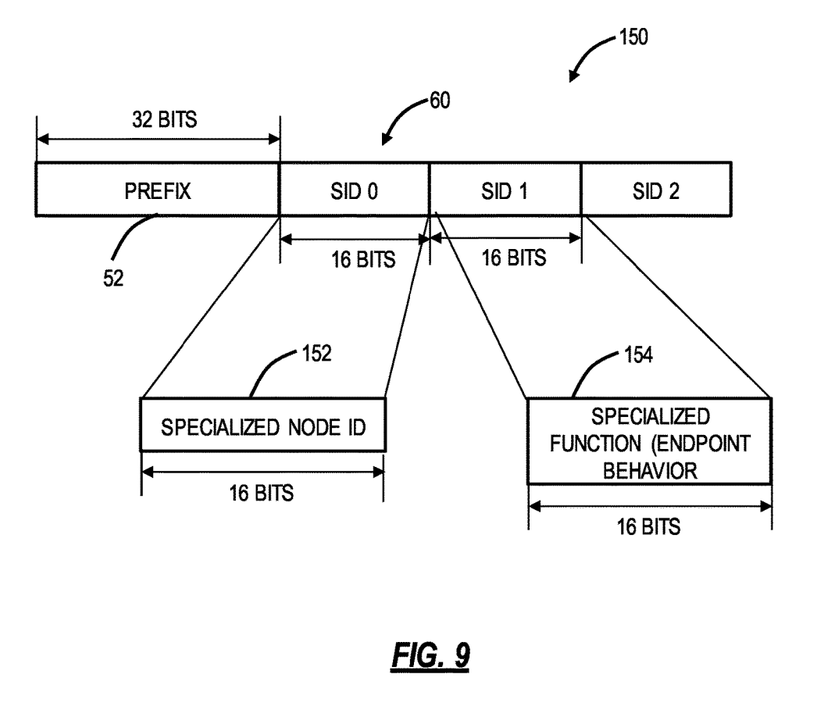
FIG. 9 is a diagram of another example uSID format for SFC where the uSID has a standard size.

FIG. 9 us a diagram of an example uSID format 150 for SFC where the uSID has a standard size. In this example embodiment, the present disclosure, for example, proposes to use a 16-bit SFC uSID 60. The first SID 0 can identify the Node, i.e., a specialized node ID 152, the next 16 bits can be specialized function (endpoint behavior) 154 to identify the Endpoint behavior (Function 108) and to identify a number of Arguments following the specialized function (endpoint behavior) 154.

Use Case Example—Standard Size uSID

Figure 10:
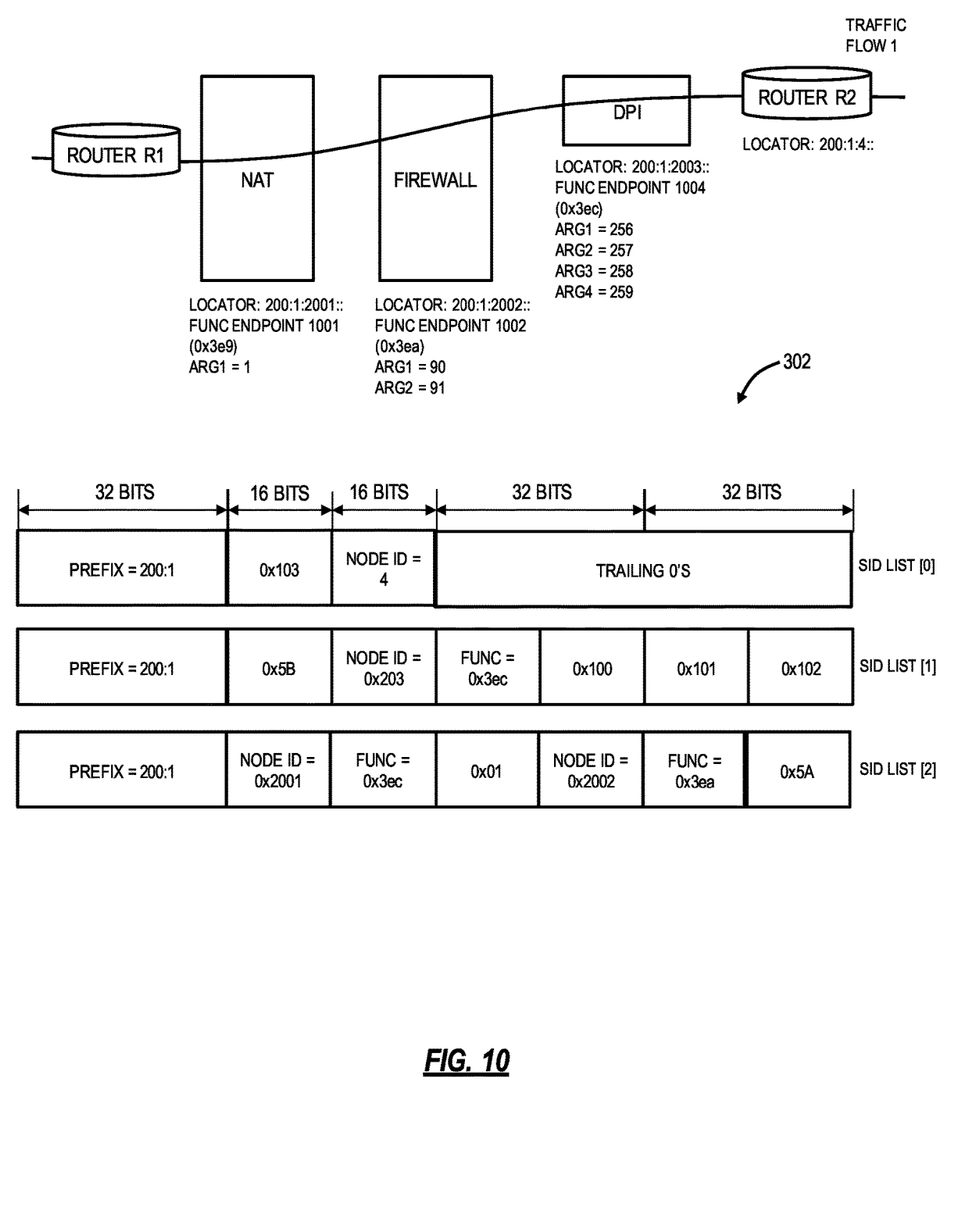
FIG. 10 is a diagram of an example use case showing a modified uSID Frame Format where the uSID has a standard size.

FIG. 10 is a diagram of an example use case showing a modified uSID Frame Format where the uSID has a standard size. Assume NAT, Firewall and DPI are the three SF's and two routers R1 and R2 as shown in the figure below and the traffic flows through this path sequentially. The source of Service Function Path (SFP) is Router R1 and the SFP comprises of NAT, Firewall, DPI and Router R2. Each of the SF's have a common 32-bit prefix block 200:1::/32. Each of the three SF's are represented by node SIDs 0x2001, & 0x2003 and have endpoint behavior 1001, 1002 & 1004 respectively. Let us assume Firewall has two 16-bit Arguments, NAT has one 16-bit Argument and DPI has four 16-bit Arguments. Assume 1001 represents an endpoint behavior with single Argument, 1002 represents an endpoint behavior with two Arguments and 1004 represents an endpoint behavior with four Arguments. Then the SID is encoded as shown in FIG. 10.

Note, this embodiment can interoperate with Service Function unaware nodes. The upside to this approach is that we will be using 16-bit uSIDs and therefore a higher compression rate can be achieved in contrast to other methods. However, we would be using up a portion of the uSID space specifically to implement this. Another Upside to this approach in contrast to other methods is that there is no restriction on the number of arguments following the Endpoint behavior.

Process

The present disclosure includes implementations at routers, R1, R2, and at the SFs in the SFC. The present disclosure can be realized as a method having steps, via circuitry configured to implement the steps, via a processing device with one or more processors configured to execute the steps, and as a non-transitory computer-readable medium with instructions that, when executed, cause one or more processors to execute the steps.

In an embodiment, a process includes

For a packet destined to a SFC, encoding one or more micro-Segment Identifiers (uSIDs) for the SFC, wherein each uSID includes a node identifier field and a service identifier field.

Responsive to any Service Functions (SFs) in the SFC needing an Argument, including any Arguments associated with respective uSIDs for the any SFs.

Transmitting the packet with the one or more uSIDs to the SFC.

The service identifier field can include an Endpoint Behavior field and a Number of Arguments field. The Number of Arguments field determines a number of field of Arguments associated with respective uSIDs for the any SFs.

The uSID can be 32-bits.

Again, the present disclosure keeps the advantage of high compression rate offered by the uSID and in addition it allows for extra functionality to support SFC.

Figure 11:
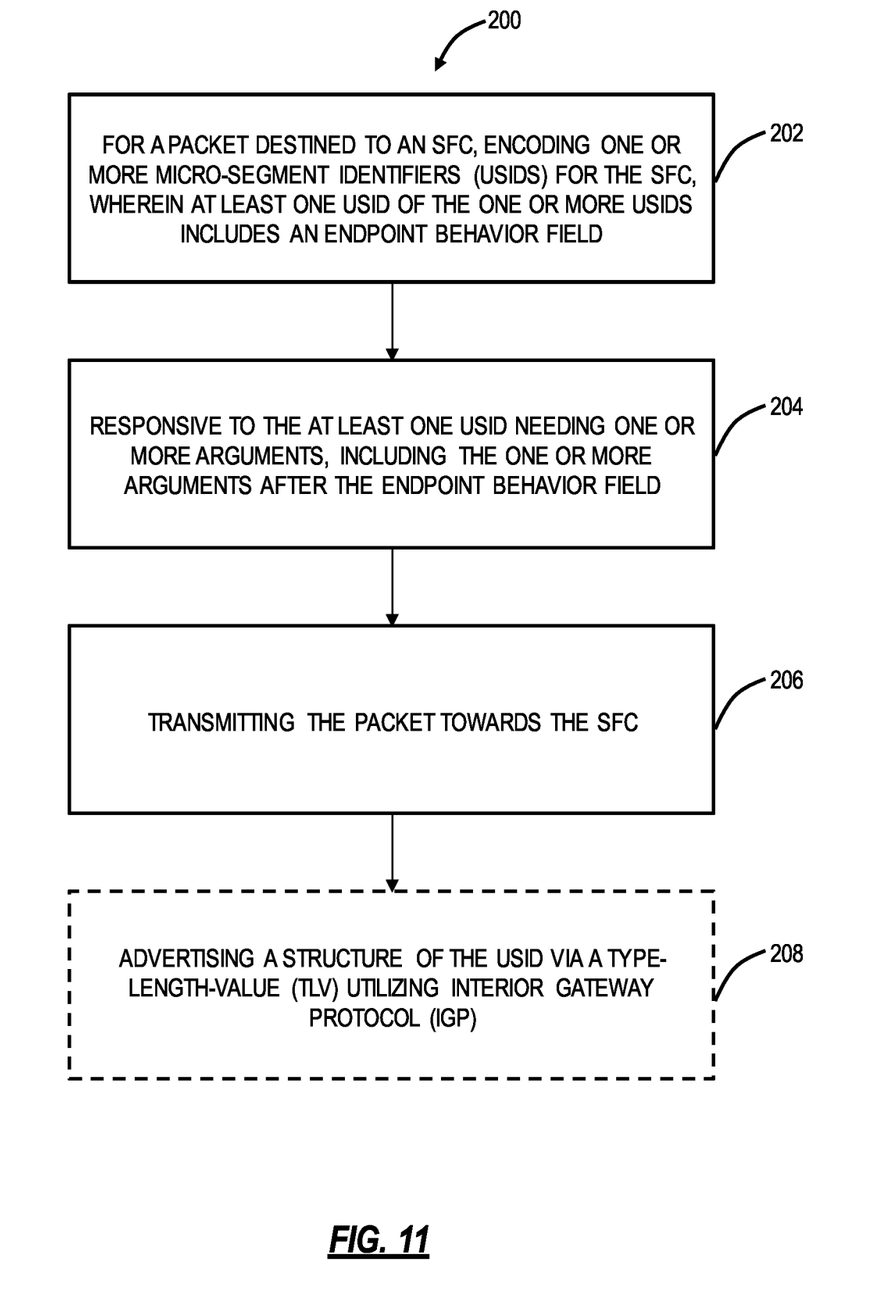
FIG. 11 is a flowchart of a process for SRv6 SFC utilizing uSIDs.

FIG. 11 is a flowchart of a process 200 for SRv6 SFC utilizing uSIDs. Again, the process 200 can be realized as a method having steps, via circuitry configured to implement the steps, via a processing device with one or more processors configured to execute the steps, and as a non-transitory computer-readable medium with instructions that, when executed, cause one or more processors to execute the steps. Of note, the process 200 contemplates either embodiment described herein, namely uSIDs with larger sizes and standard sized uSIDs.

The process 200 includes, for a packet destined to an SFC, encoding one or more micro-Segment Identifiers (uSIDs) for the SFC, wherein at least one uSID of the one or more uSIDs includes an Endpoint Behavior field (step 202); responsive to the at least one uSID needing one or more Arguments, including the one or more Arguments after the Endpoint Behavior field (step 204); and transmitting the packet towards the SFC (step 206). The process 200 can further include advertising a structure of the uSID via a Type-Length-Value (TLV) utilizing Interior Gateway Protocol (IGP) (step 208). Note, the one or more Arguments after the Endpoint Behavior field can mean directly after the Endpoint Behavior field as in the case of the standard size uSID embodiment or after the Number of Arguments field in the case of the larger size uSID embodiment. That is, this does not necessarily mean directly after.

The at least one uSID can include one or more of a node identifier field and a service identifier field. For example, the embodiment with a larger uSID can include both the node identifier field and the service identifier field, whereas the embodiment with the standard sized uSID excludes the service identifier field as it is based on the presence within the sub-range. The at least one uSID can include one of (1) a Number of Arguments field that specifies a number of the one or more Arguments and (2) the number of the one or more Arguments being embedded in the Endpoint Behavior field. The at least one uSID can include a size greater than 16-bits.

The at least one uSID can be in a sub-group having a pre-defined range to denote the at least one uSID is for Service Functions (SFs). There can be at least one additional sub-group range for for identifying any of locally assigned uSID ranges and globally assigned uSID ranges. The Endpoint Behavior field can encode both behavior and a Number of Arguments field that specifies a number of the one or more Arguments.

Additional Notes

Of note, the Filsfils et al. draft incorporated above does suggest a 32-bit uSID, but in the context of all the 32-bits being used for Node Identifier. So you could have 4.3 million SIDs (assigned from GIB, LIB). Filsfils et al. do disclose how the uSID is formulated for a policy and lacks the facility to provide Arguments.

The Locator and end point will continue to be signaled according to RFC 8986. The present disclosure modifies with how the packet frame and SID List are composed. Our SID format within the data packet is "COMMON PREFIX: NODEID: FUNC: NUMofARG: ARGs". This is in contrast to uSID draft that employs "COMMON PREFIX: NODEID" (uN) or "COMMON PREFIX: NODEID: FUNC" (uA).

For interoperability, the SRv6 architecture has been designed such that a network can have a mixture of SRv6-capable and SRv6-incapable nodes. SRv6-incapable nodes will forward the packets by doing longest prefix match on DA field.

Intermediate Node Processing

The foregoing description focused on the uSID encoding and transmission from an initiating node. FIGS. 7 and 9 are examples illustrate processing at intermediate nodes, i.e., SFs. Referring to FIG. 7, the router R1 transmits a packet with a uSID frame format 300 to the NAT, the firewall, the DPI, and finally to the router R2, and similarly in FIG. 9 with a uSID format 302. Again, FIG. 7 illustrates the uSID frame format 300 with 32-bit uSIDs, whereas FIG. 9 illustrates the uSID frame format 302 with standard size uSIDs. The uSID frame format 300 includes three SIDs in the SID list, SID list [0], [1], and [2], i.e., a total of 9 uSIDs and 3 prefixes (200:1).

In both FIGS. 7 and 9, the traffic flow is from the router R1 to the router R2, i.e., from left to right. The processing of the uSID frame format 300, 302 for both cases is from left to right and bottom to top. For example, SID LIST[2] will be processed first followed by SID LIST[1] and finally SID LIST[0] is processed. Also, in both FIGS. 7 and 9, there are shaded fields, e.g., in the uSID frame format 0x102, 0x103, etc., and in the uSID frame 302 0x103, trailing 0's, etc., and these shaded fields are the values of the arguments themselves, in hexadecimal values.

In FIG. 7, the NAT receives a packet with the uSID frame format 300, starting with Node ID=1, function=0x65, and number of arguments=1, followed by the ARG1=1 (0x01) and then a pad. The frame format processed by Firewall (input of firewall) will be devoid of the first 64 bits after prefix and the remaining elements will be shifted to the left. It will look like this (in the following text, 'l' denotes a boundary:

SID LIST[0]=>prefix|0x101|0x102|0x103|0x104| Nodeid=4|func=0x1, Num=0
SID LIST[1]=>prefix|Node id=2|func=0x66, num=1|0x5A|0x56|Nodeid=3|func=0x67, Num=2

The frame format processed by DPI (input of DPI) will be devoid of the first 64 bits after prefix and the remaining elements will be shifted to the left. It will look like this:

SID LIST[0]=>prefix|Nodeid=4|func=0x1, Num=0|PADDED with 0's
SID LIST[1]=>prefix|Nodeid=3|func=0x67, Num=2|0x101|0x102|0x103|0x104

The frame format processed by Router R2 will be devoid of the first 64 bits after prefix and the remaining elements will be shifted to the left. It will look like this:

SID LIST[0]=>prefix|Nodeid=4|func=0x1, Num=0|PADDED with 0's

In FIG. 9, the frame format processed by NAT is exactly as shown in FIG. 9. The frame format processed by Firewall (input of firewall) will be devoid of the first 64 bits after prefix and the remaining elements will be shifted to the left. It will look like this:

SID LIST[0]=>prefix|0x101|0x102|0x103|0x104| Nodeid=4|func=0x1,
SID LIST[1]=>prefix|Nodeid=0x2002|func= 0x3ea|0x5A|0x5B| Nodeid=0x2003|func=0x3ec The frame format processed by DPI (input of DPI) will be devoid of the first 64 bits after prefix and the remaining elements will be shifted to the left. It will look like this:

SID LIST[0]=>prefix|Nodeid=4|PADDED with 0's
SID LIST[1]=>prefix|Nodeid=0x2003|func= 0x3ec|0x10|0x102|0x103|0x104

The frame format processed by Router R2 will be devoid of the first 64 bits after prefix and the remaining elements will be shifted to the left. It will look like this:

SID LIST[0]=>prefix|Nodeid=4|PADDED with 0's

CONCLUSION

It will be appreciated that some embodiments described herein may include one or more generic or specialized processors ("one or more processors") such as microprocessors; central processing units (CPUs); digital signal processors (DSPs): customized processors such as network processors (NPs) or network processing units (NPUs), graphics processing units (GPUs), or the like; field programmable gate arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more application-specific integrated circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a read-only memory (ROM), a programmable read-only memory (PROM), an erasable programmable read-only memory (EPROM), an electrically erasable programmable read-only memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. The foregoing sections include headers for various embodiments and those skilled in the art will appreciate these various embodiments may be used in combination with one another as well as individually.

What is claimed is:

1. A node in a Segment Routing Internet Protocol version 6 (SRv6) network, the node comprising circuitry configured to:
   for a packet destined to a Service Function Chain (SFC), encode one or more micro-Segment Identifiers (uSIDs) for the SFC, wherein at least one uSID of the one or more uSIDs includes an Endpoint Behavior field, wherein the at least one uSID includes one of (1) a Number of Arguments field that specifies a number of one or more Arguments and (2) the number of the one or more Arguments being embedded in the Endpoint Behavior field;
   responsive to the at least one uSID needing one or more Arguments, include the one or more Arguments after the Endpoint Behavior field, and
   transmit the packet towards the SFC.

2. The node of claim 1, wherein the circuitry is further configured to advertise a structure of the uSID via a Type-Length-Value (TLV) utilizing Interior Gateway Protocol (IGP).

3. The node of claim 1, wherein the at least one uSID includes one or more of a node identifier field and a service identifier field.

4. The node of claim 1, wherein the at least one uSID includes a size greater than 16-bits.

5. The node of claim 1, wherein the at least one uSID is in a sub-group having a pre-defined range to denote the at least one uSID is for Service Functions (SFs).

6. The node of claim 5, wherein, in addition to the sub-group to denote SFs, there is at least one additional sub-group range for identifying any of locally assigned uSID ranges and globally assigned uSID ranges.

7. The node of claim 1, wherein the Endpoint Behavior field encodes both behavior and a Number of Arguments field that specifies a number of the one or more Arguments.

8. A method implemented by a node in a Segment Routing Internet Protocol version 6 (SRv6) network, the method comprising steps of:
   for a packet destined to a Service Function Chain (SFC), encoding one or more micro-Segment Identifiers (uSIDs) for the SFC, wherein at least one uSID of the one or more uSIDs includes an Endpoint Behavior field, and wherein the at least one uSID includes one of (1) a Number of Arguments field that specifies a number of one or more Arguments and (2) the number of the one or more Arguments being embedded in the Endpoint Behavior field,
   responsive to the at least one uSID needing one or more Arguments, including the one or more Arguments after the Endpoint Behavior field; and
   transmitting the packet towards the SFC.

9. The method of claim 8, wherein the steps further include advertising a structure of the uSID via a Type-Length-Value (TLV) utilizing Interior Gateway Protocol (IGP).

10. The method of claim 8, wherein the at least one uSID includes one or more of a node identifier field and a service identifier field.

11. The method of claim 8, wherein the at least one uSID includes a size greater than 16-bits.

12. The method of claim 8, wherein the at least one uSID is in a sub-group having a pre-defined range to denote the at least one uSID is for Service Functions (SFs).

13. The method of claim 12, wherein, in addition to the sub-group to denote SFs, there is at least one additional sub-group range for identifying any of locally assigned uSID ranges and globally assigned uSID ranges.

14. The method of claim 8, wherein the Endpoint Behavior field encodes both behavior and a Number of Arguments field that specifies a number of the one or more Arguments.

15. A non-transitory computer-readable medium comprising instructions that, when executed, cause a node, in a Segment Routing Internet Protocol version 6 (SRv6) network, to perform steps of:
   for a packet destined to a Service Function Chain (SFC), encoding one or more micro-Segment Identifiers (uSIDs) for the SFC, wherein at least one uSID of the one or more uSIDs includes an Endpoint Behavior field, and wherein the at least one uSID specifies a Number of Arguments based on either a field that specifies a number of one or more Arguments or based on encoding in the Endpoint Behavior field;
   responsive to the at least one uSID needing one or more Arguments, including the one or more Arguments after the Endpoint Behavior field; and
   transmitting the packet towards the SFC.

16. The non-transitory computer-readable medium of claim 15, wherein the steps further include advertising a structure of the uSID via a Type-Length-Value (TLV) utilizing Interior Gateway Protocol (IGP).

17. The non-transitory computer-readable medium of claim 16, wherein the at least one uSID includes a size greater than 16-bits.

* * * * *